United States Patent
Krishnamurthy et al.

(10) Patent No.: US 7,363,534 B1
(45) Date of Patent: Apr. 22, 2008

(54) METHOD AND SYSTEM FOR STATEFUL SWITCH-OVER IN A HIGH-AVAILABILITY POINT TO POINT SYSTEM

(75) Inventors: Ramesh Krishnamurthy, Burlington, NC (US); Jeffrey D. Haag, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 10/260,771

(22) Filed: Sep. 30, 2002

(51) Int. Cl.
*G06F 11/00* (2006.01)

(52) U.S. Cl. ............................................ 714/13; 714/4

(58) Field of Classification Search ............... 714/4, 714/10, 13
See application file for complete search history.

(56) References Cited

U.S. PATENT DOCUMENTS

| | | | |
|---|---|---|---|
| 5,148,433 A * | 9/1992 | Johnson et al. ............... 714/10 |
| 5,787,249 A * | 7/1998 | Badovinatz et al. ......... 709/201 |
| 6,108,699 A * | 8/2000 | Moiin ........................ 709/221 |
| 6,285,960 B1 | 9/2001 | Fung et al. ................. 702/107 |
| 6,360,331 B2 * | 3/2002 | Vert et al. ....................... 714/4 |
| 6,397,345 B1 * | 5/2002 | Edmonds et al. ............... 714/4 |
| 6,446,219 B2 * | 9/2002 | Slaughter et al. ............... 714/4 |
| 6,622,261 B1 * | 9/2003 | Laranjeira et al. ............. 714/11 |
| 6,915,445 B2 * | 7/2005 | Navar et al. ..................... 714/4 |
| 6,920,580 B1 * | 7/2005 | Cramer et al. .................. 714/4 |
| 2003/0018927 A1 * | 1/2003 | Gadir et al. ..................... 714/4 |
| 2003/0056013 A1 * | 3/2003 | Laschkewitsch et al. ... 709/249 |
| 2003/0056138 A1 * | 3/2003 | Ren ................................. 714/4 |

OTHER PUBLICATIONS

Point to Point Protocol (PPP); Feb. 20, 2002; Cisco systems, Inc.; http://www.cisco.com/univercd/cc/td/doc/cisintwk/ito_doc/ppp.htm.*
System Commands [Cisco 700 Series ISDN Access Routers] Manual; http://www.cisco.com/en/US/products/hw/routers/ps331/prod_command_reference09186a00800ed8ef.*
PPP Commands [Cisco 700 Series ISDN Access Routers] Manua; http://www.cisco.com/en/US/products/hw/routers/ps331/prod_command_reference09186a00800ed8e4.*
MPLS: The Magic Behind the Myths; IEEE Communications Magazine; Jan. 2000; pp. 124-131.*
System Commands [Cisco 700 Series ISDN Access Routers] Manual; http://www.cisco.com/en/US/products/hw/routers/ps331/prod_command_reference09186a00800ed8ef, unknown date.*
PPP Commands [Cisco 700 Series ISDN Access Routers] Manua; http://www.cisco.com/en/US/products/hw/routers/ps331/prod_command_reference09186a00800ed8e4, unknown date.*

* cited by examiner

*Primary Examiner*—Joshua A. Lohn
(74) *Attorney, Agent, or Firm*—Campbell Stephenson LLP

(57) ABSTRACT

A method and system for stateful switch-over in a high-availability point to point system is disclosed. The disclosed method includes in one embodiment detecting a change in state of a point to point link between a first peer data processing system and a second peer data processing system; storing state data for the point to point link with an active processor within the first peer data processing system in response to detecting the change in state; and transferring a copy of the state data to a standby processor within the first peer data processing system. The disclosed method includes in another embodiment, transferring data between the first peer data processing system and the second peer data processing system utilizing the active processor; detecting a switch-over condition; and transferring data between the first peer data processing system and the second peer data processing system utilizing the standby processor in response to detecting the switch-over condition.

49 Claims, 7 Drawing Sheets

METHOD AND SYSTEM FOR STATEFUL SWITCH-OVER IN A HIGH-AVAILABILITY POINT TO POINT SYSTEM

BACKGROUND

1. Technical Field

The present invention relates to communication networks generally. More specifically, the present invention relates to a method and system for stateful switch-over in a high-availability point to point system.

2. Description of Related Art

Point to point protocols such as the Point-to-Point Protocol (PPP) and the Serial Line Interface Protocol (SLIP) provide a mechanism by which data (e.g., datagrams, packets, etc.) may be transmitted between peer data processing systems coupled together by one or more point to point serial links. Such serial links may be wired or wireless and may be implemented using any of a variety of optical and/or electrical physical transmission media (e.g., T-1/DS1, T-3/DS3, SONET Optical Carrier, etc.). PPP includes three main components, a format and method for encapsulating datagrams, a link control protocol (LCP) for establishing, configuring, and testing data-link connections, and a family of network control protocols (NCPs) for establishing and configuring different network-layer protocols (e.g., IP, IPv6, IPX, AppleTalk, Banyan Vines, NetBIOS, etc.).

In order to establish communications over a PPP link, each peer of the link first transmits LCP packets to configure and test the data link. After the link has been established, a peer may optionally be authenticated utilizing an authentication protocol specified when the link was established. Thereafter, NCP packets are transmitted to configure one or more network-layer protocols. Once the selected network-layer protocols have been configured, datagrams from each network-layer protocol can be sent over the link. The link remains configured for communications until explicit LCP or NCP packets close the link or portion thereof down, or some external event occurs (e.g., an inactivity timer expires, the network administrator intervenes, etc.).

FIG. 1 illustrates a high-level Point-to-Point Protocol state diagram according to the prior art. The illustrated prior art state diagram includes a dead link state, a link establishment state, an authentication state, a network-layer protocol state, and a link-termination state. In the dead link state, the physical layer is "down", i.e., not ready to transmit data. If the physical layer becomes ready to transmit data, indicated by the occurrence of an external event such as carrier detection or network administrator configuration, an "Up" event is generated to signal LCP that the link is entering the link establishment phase.

In the link establishment phase, LCP is used to establish a connection between peers through an exchange of LCP configuration packets. A configuration request (Configure-Request) packet may first be transmitted from one peer to another to indicate the desire to open a connection with a specified set of configuration options (e.g., maximum-receive-unit, authentication-protocol, quality protocol, magic number, protocol-field-compression, address-and-control-field-compression, etc.). Configuration options allow negotiation of modifications to the default characteristics of a point to point link. If a configuration option is not included in a Configure-Request packet, the default value for that configuration option is assumed. Similarly, unless otherwise specified, all configuration options apply in a half-duplex fashion; typically, in the receive direction of the link from the point of view of the Configure-Request packet sender.

A peer receiving a Configure-Request packet may acknowledge the reception of a Configure-Request packet having an acceptable set of configuration options utilizing a configuration acknowledgment (Configure-Ack) packet. Alternatively, if the configuration options specified in a Configure-Request packet are not acceptable or are unrecognizable or not acceptable for negotiation, configuration negative acknowledgment (Configure-Nak) or configuration rejection (Configure-Reject) reply packets, respectively, may be utilized. The link establishment phase is complete, and the LCP Opened state entered, once a Configure-Ack packet has been both sent and received. Should the configuration process fail for any reason, the link transitions back to the dead link phase.

Following link establishment, a peer may optionally be required to authenticate itself utilizing an authentication protocol such as the Password Authentication Protocol (PAP), Challenge Handshake Authentication Protocol, etc. specified during link establishment. The exchange of authentication packets occurs during the authentication phase, which precedes any network-layer protocol packets being exchanged during the network phase. Although, by default, authentication is not mandatory, authentication should take place as soon as possible after link establishment. A link quality assessment to determine when, and how often the link is dropping data may be performed during the authentication phase however. If authentication fails for any reason, the LCP transitions to a CLOSED/DOWN state and PPP moves back into the dead link phase.

Once a link has been established and authenticated (if necessary), each network-layer protocol (e.g., IP, IPX, AppleTalk, etc.) is separately configured by an appropriate NCP during a network-layer protocol phase as shown. Each NCP is used to configure its corresponding network-layer protocol through an exchange of configure packets (e.g., Configure-Request, Configure-Ack, Configure-Nak, Configure-Reject, etc.) just as described with respect to the link establishment by the LCP. Each NCP may be Opened and/or Closed at any time while the LCP-configured link is open. After an NCP has reached the Opened state, PPP will carry corresponding network-layer protocol packets.

Following the network-layer protocol phase, or at any time, a link may be terminated within the link termination phase through an exchange of LCP Terminate packets. Link termination may occur due to the loss of carrier, an authentication failure, a link quality failure, the expiration of an idle-period timer, the administrative closing of the link (e.g., to update network element/peer data processing system operating software), etc. The fact that one NCP has closed is not sufficient reason alone however to cause the termination of the link, even if that NCP was the only NCP currently in the Opened state. When the link is closing, PPP informs the network-layer protocols so that they may take appropriate action. Following the link termination phase, the link is returned to the dead link phase until an event occurs indicating that the physical layer is ready to transmit data.

PPP implementations in conventional peer data processing systems may additionally include a multilink protocol (MLP) which permits a system to indicate to its peer that it is capable of combining multiple physical links into a logical "bundle". Multilink is negotiated during LCP option negotiation by sending a multilink option as part of the initial LCP option negotiation. Once multilink has been successfully negotiated, the sending system is free to send data encapsulated and/or fragmented with the multilink header thereby creating a virtual link made up of multiple independent physical links and having greater bandwidth than any of the constituent members.

FIG. 2 illustrates a high-level switch-over process flow diagram according to the prior art. To reduce the downtime of point to point serial links, conventional peer data processing systems (e.g., network elements or nodes, hosts, routers, gateways, etc.) include an active or "primary" processor to configure and transmit data utilizing links and one or more standby or "secondary" processors to supplant the active processor should it fail. According to the illustrated process, a PPP link is configured utilizing an active processor (process block 200) and the resulting link's state data (e.g., configuration options) is stored locally to the active processor (process block 202) for example, by storing it within memory local to and directly accessible only by, the active processor. PPP link configuration according to the illustrated process may include LCP link configuration, NCP protocol configuration, and/or the configuration of MLP aggregate links or bundles. Thereafter, the active processor transmits data utilizing the configured PPP link (process block 204) and the standby processor is utilized to detect any switch-over conditions (e.g., hardware and/or software errors which cause an active processor to crash or reset) (process block 206).

If a determination is made that no switch-over condition has occurred, a determination is then made whether or not the link has been terminated (process block 208) for a condition not requiring switch-over (e.g., the expiration of an idle-period timer, the administrative closing of the link, etc.). If the link has not been terminated, the active processor continues to transmit data (process block 204) until a determination is made that a switch-over condition has occurred or that the link has been terminated as described. Otherwise the illustrated process is terminated along with the link.

If a determination is made by the standby processor that a switch-over condition has in fact occurred, the standby processor becomes the active processor, reconfiguring the PPP link (process block 210), storing link state data locally (process block 212), and transmitting data utilizing the reconfigured PPP link (process block 214) before the illustrated process is terminated. Similarly, in other conventional peer data processing system PPP implementations, the formerly active processor may be reinitialized as the standby processor. The formerly active processor of such systems may then be utilized to detect switch-over conditions in the formerly standby (now active) processor, thereby allowing the active processor to transmit data utilizing the configured PPP link until a switch-over condition is detected or the link is terminated as previously described.

In such conventional "highly-available" peer data processing systems therefore, the standby processor reconfigures each of the peer's individual links including renegotiating all LCP and NCP-level configuration options. While this technique provides a faster recovery time than uniprocessor peer data systems which must re-initialize completely and then reconfigure all links, it still renders a peer data processing system temporarily unavailable while potentially thousands of its links are reconfigured and may trigger route update procedures for an entire communications network of which the peer is a part.

SUMMARY

A method and system for stateful switch-over in a high-availability point to point system is disclosed. The disclosed method includes in one embodiment, detecting a change in state of a point to point link between a first peer data processing system and a second peer data processing system; storing state data for the point to point link with an active processor within the first peer data processing system in response to the detecting; and transferring a copy of the state data to a standby processor within the first peer data processing system in response to the storing.

In another embodiment, the disclosed method includes: maintaining state data for a point to point link between a first peer data processing system and a second peer data processing system with both an active processor and a standby processor within the first peer data processing system; transferring data between the first peer data processing system and the second peer data processing system utilizing the active processor; detecting a switch-over condition; and transferring data between the first peer data processing system and the second peer data processing system utilizing the standby processor in response to the detecting.

In yet another embodiment, the disclosed method includes: configuring a point to point link between a first peer data processing system and a second peer data processing system, where the first peer data processing system includes an active processor and a standby processor; storing state data for the point to point link with both the active processor and the standby processor; and dynamically updating the state data with both the active processor and the standby processor.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

Embodiments of the present invention are illustrated by way of example and not limitation in the figures of the accompanying drawings in which similar references are utilized to indicate similar elements and in which.

DETAILED DESCRIPTION

Embodiments of the present invention may include features or processes embodied within machine-executable instructions provided by a machine-accessible medium. Such a medium may include any mechanism which provides (i.e., stores and/or transmits) data in a form accessible by a machine (e.g., a data processing system, host, router, or other network element, etc.). For example, a machine-accessible medium may include volatile and/or non-volatile media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Such instructions can be used to cause a general or special purpose processor, programmed with the instructions, to perform processes of the present invention. Alternatively, processes of the present invention may be performed by specific hardware components containing hard-wired logic to perform operations or by any combination of programmed data processing components and hardware components. Thus, embodiments of the present invention may include software, data processing hardware, data processing system-implemented methods, and various processing operations, further described herein.

Figure 1:
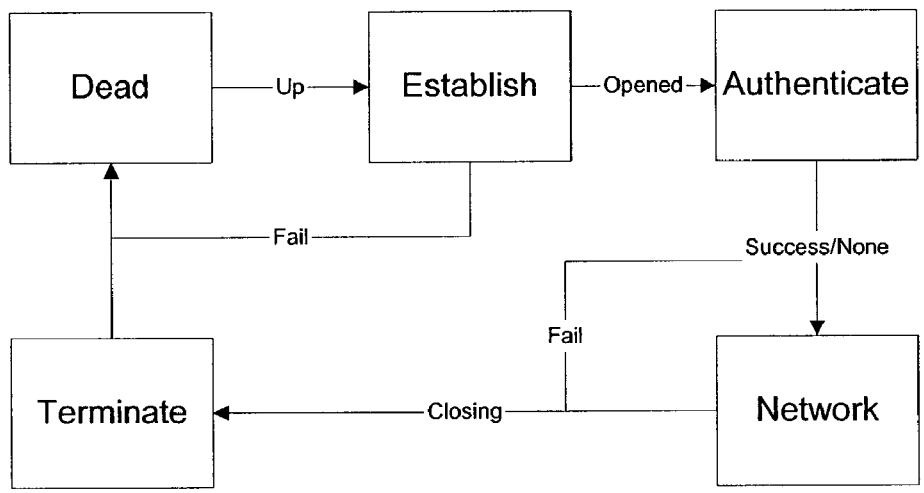
FIG. 1 illustrates a high-level Point-to-Point Protocol state diagram according to the prior art.
Figure 2:
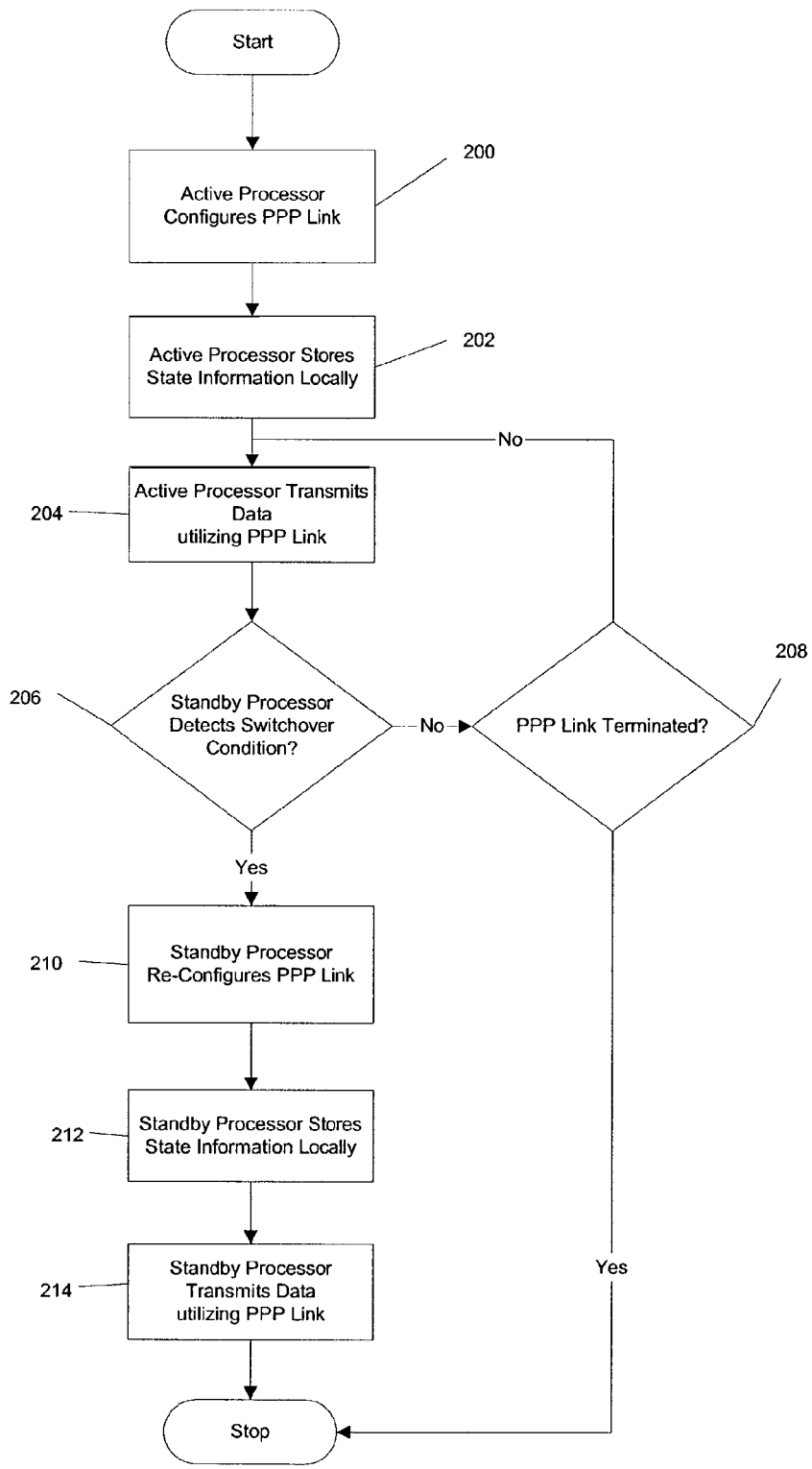
FIG. 2 illustrates a high-level switch-over process flow diagram according to the prior art.
Figure 3:
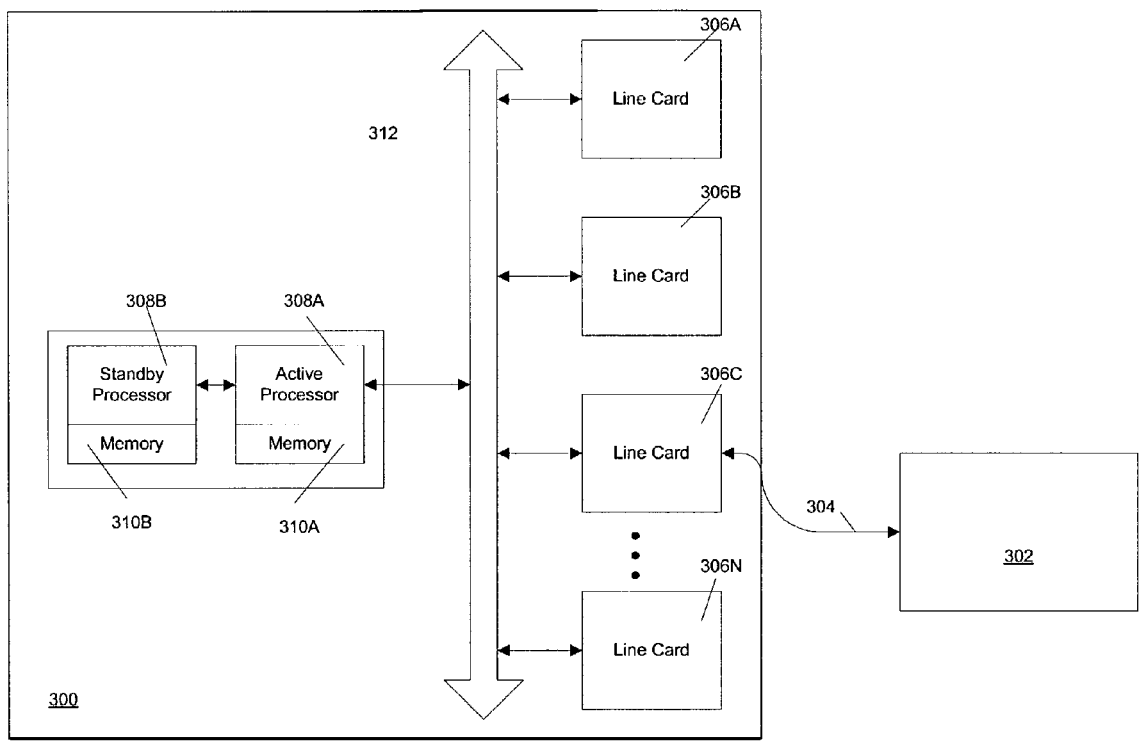
FIG. 3 illustrates a high-level block diagram of a communications system useable with one or more embodiments of the present invention.

FIG. 3 illustrates a high-level block diagram of a communications system useable with one or more embodiments of the present invention. A communication system according to an embodiment of the present invention includes a plurality of peer data processing systems communicatively coupled together and may comprise one or more internet, intranet, and/or extranet communication networks (e.g., LANs, WANs, MANs, etc.) implemented utilizing any of a number of known protocols, topologies, and architectures. More specifically, the communication system of the illustrated embodiment includes a first peer data processing system 300 and a second peer data processing system 302 communicatively coupled together utilizing a point to point link 304.

Point to point link 304 may in turn be coupled to each of peer data processing systems 300 and 302 utilizing one or more line cards 306A-306D as illustrated with respect to peer data processing system 300. In one embodiment of the present invention, line cards 306A-306D are provided to enable peer data processing system 300 to be coupled to any of a variety of optical and/or electrical physical transmission media (e.g., T-1/DS1, T-3/DS3, SONET Optical Carrier, etc.). While a single point to point link 304 has been depicted, multiple physical and/or logical point to point links may be coupled to one or more of a peer data processing system's line cards. For example, according to one embodiment of the present invention, peer data processing systems 300 and 302 are communicatively coupled together utilizing a multilink protocol logical point to point link comprised of a bundle of two or more physical point to point links.

In the embodiment depicted in FIG. 3, line cards 306A-306D are communicatively coupled together and to an active processor 308A and a standby processor 308B as well as associated local memories 310A and 310B of the active and standby processors, respectively, via an interconnect 312 (e.g., a switch, mesh, backplane, bus, or the like). According to one embodiment of the present invention, active processor 308A and standby processor 308B along with local memories 310A and 310B are utilized to control the transfer of data to and from peer data processing system 300 via line cards 306A-306D.

While local memories 310A and 310B of FIG. 3 have been illustrated as being adjacent to their respective processors, in alternative embodiments of the present invention their location as well as the mechanism by which they are coupled to peer data processing system 300 may be varied. For example, memories 310A and 310B may be independently implemented within registers or register sets/files and/or cache memories of an associated processor, and/or within independent memories coupled to the active and standby processors via interconnect 312. Similarly, in an alternative embodiment of the present invention, local memories 310A and 310B may comprise address ranges or memory-mapped portions, accessible by their corresponding (active or standby) processor, of a single memory coupled to the peer data processing system 300 in any of the manners described herein. Moreover, although standby processor 308B has been depicted as being coupled to interconnect 312 and peer data processing system 300 in a pass-through manner via active processor 308A, in an alternative embodiment standby processor 308B may be coupled to and communicate with active processor 308A utilizing interconnect 312.

Figure 4:
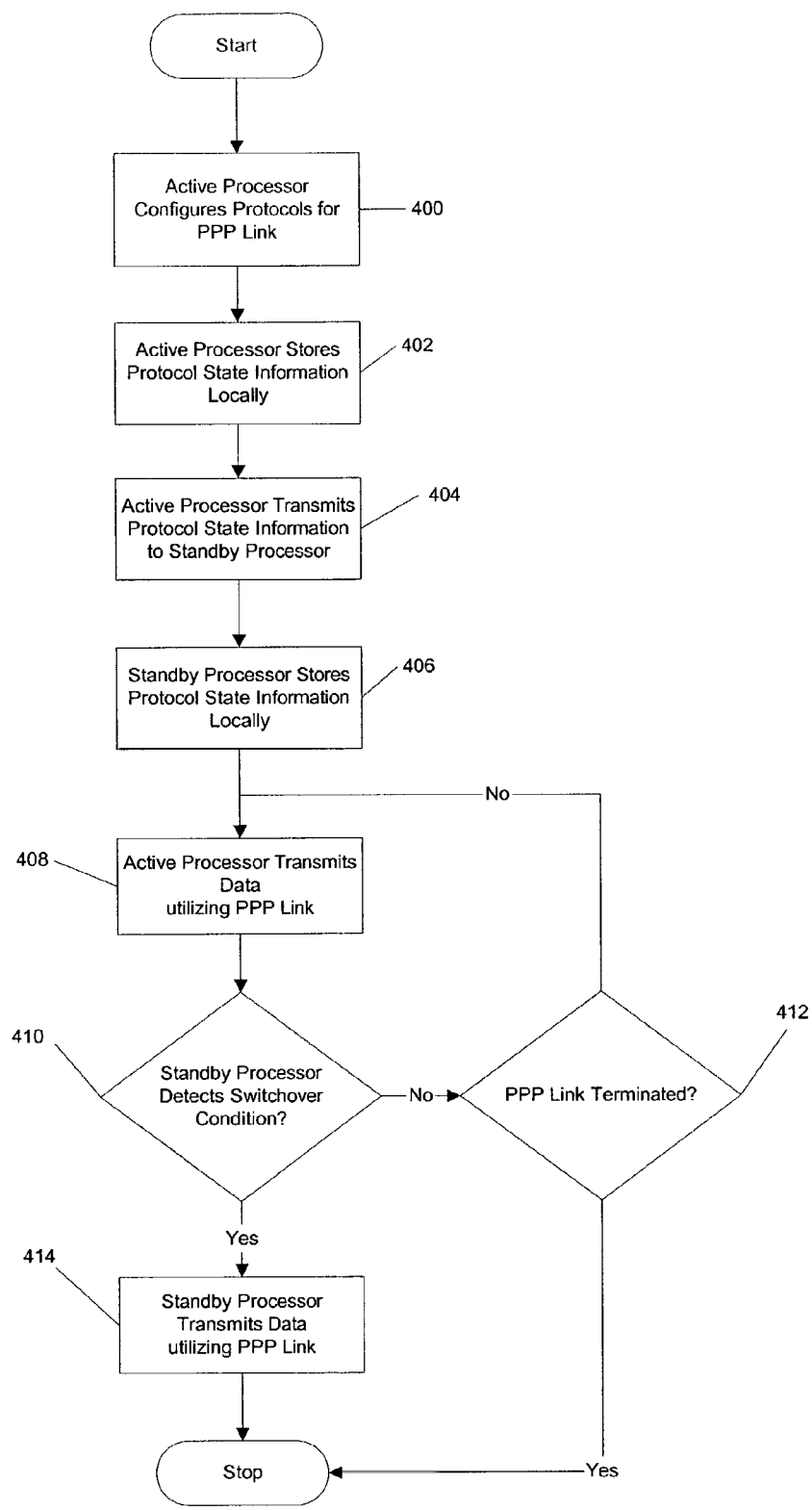
FIG. 4 illustrates a high-level switch-over process flow diagram according to an embodiment of the invention.

FIG. 4 illustrates a high-level switch-over process flow diagram according to an embodiment of the invention. According to the illustrated process, a PPP link is configured utilizing an active processor (process block 400) and the resulting link's state data (e.g., configuration options) is stored locally to the active processor (process block 402). PPP link configuration according to the illustrated process may include LCP link configuration, NCP protocol configuration, and/or the configuration of MLP aggregate links or bundles. Thereafter, the active processor transmits the resulting link's state data to a standby processor (process block 404) which receives and stores the state data locally (process block 406). In an alternative embodiment, only select state data (e.g., only that data which is critical to the proper operation of the point to point link) is transferred to, received by, and stored within the standby processor. Data is then transferred by the active processor utilizing the configured PPP link (process block 408) and the standby processor is utilized to detect any switch-over conditions (process block 410).

If a determination is made that no switch-over condition has occurred, a determination is then made whether or not the link has been terminated (process block 412) for a condition not requiring switch-over (e.g., the expiration of an idle-period timer, the administrative closing of the link, etc.). If the link has not been terminated, the active processor continues to transmit data (process block 408) until a determination is made that a switch-over condition has occurred or that the link has been terminated as described. Otherwise the illustrated process is terminated along with the link.

If a determination is made by the standby processor that a switch-over condition has in fact occurred, the standby processor becomes the active processor, transmitting data utilizing the PPP link (process block 414) and the locally-stored state data before the illustrated process is terminated. In one embodiment of the present invention, state data is transferred from the active processor to the standby processor at predefined points during the link's configuration (e.g., following the authentication of a link, after an NCP such as the Internet Protocol Control Protocol gets to an OPEN state, after an NCP goes to a CLOSED state, and after the LCP gets to a CLOSED state). In another embodiment of the present invention, state data is transferred from the active processor to the standby processor whenever any change in link state is detected.

The standby processor uses the transferred state data to recreate the link's state locally and to mirror the operational state of the active processor. Once the state data has been transferred and processed, the PPP link is in an OPEN state on the standby processor and the state data is installed. The standby processor may consequently transfer data utilizing the PPP link following the occurrence and detection of a switch-over condition without having to re-configure the link, re-negotiate configuration options, perform route updates, etc. and point to point link downtime may be significantly decreased.

As described herein, the formerly active processor may similarly be reinitialized as the standby processor in other conventional peer data processing system implementations. The formerly active processor of such systems may then be utilized to detect switch-over conditions in the formerly standby (now active) processor, thereby allowing the active processor to transmit data via the configured PPP link until a switch-over condition is detected or the link is terminated.

According to one embodiment, the state data transferred from the active processor to the standby processor may include one or more of a request acknowledgment packet transferred to and/or from the active processor's associated peer data processing system (e.g., an LCP or NCP Configure-Ack packet), an authenticated name of a peer data processing system communicating with the active processor's associated peer data processing system utilizing the point to point link, and a negotiated network-layer address (e.g., an IP address). State data may be transferred from an active to a standby processor utilizing any of variety of formats including, in one embodiment, a state data message including one or more attribute value pairs further described herein with respect to FIG. 7, allowing state data to be easily changed, expanded, and/or removed and providing compatibility between different Point-to-Point Protocol versions.

In another embodiment of the present invention, bulk transfer and/or dynamic update techniques are implemented. According to the described embodiment, state data for a plurality of point to point links associated with a peer data processing system is first transferred from an active processor to a standby processor within an associated peer data processing system (bulk transfer or "synchronization") in response to the occurrence and/or detection of a predetermined event such as restart or re-initialization of the peer data processing system, selection and/or activation of a high-availability operation mode, etc. Thereafter, dynamic updates of one or more links associated with the peer are performed in response to a detection of a change in link state including the addition, removal, activation, inactivation, authentication, and/or reconfiguration of a link.

Figure 5:
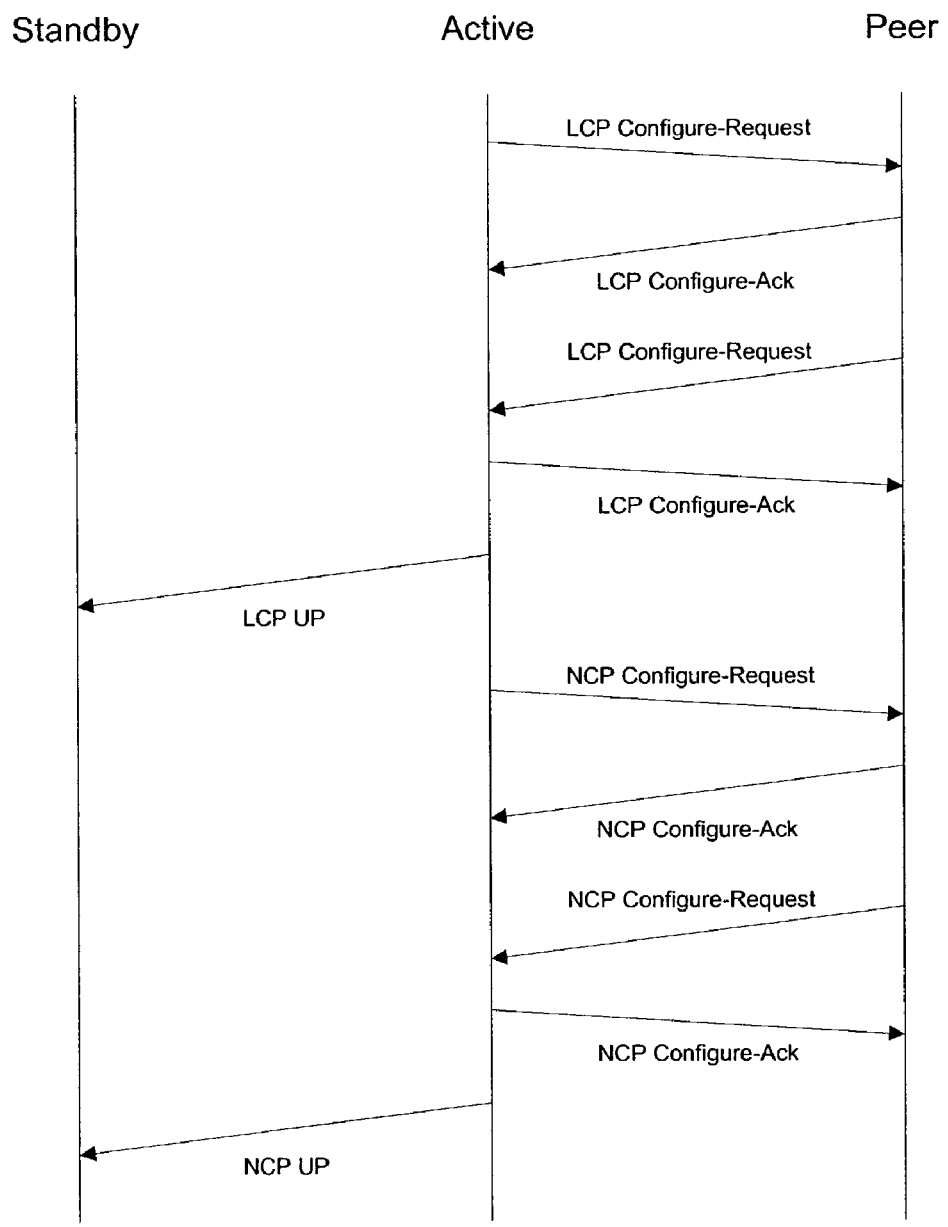
FIG. 5 illustrates a process diagram according to an embodiment of the present invention.

FIG. 5 illustrates a process diagram according to an embodiment of the present invention. In order to indicate a desire to communicate over a point to point link, a send configure request action is performed to transfer an LCP Configure-Request packet from an active processor of a first peer data processing system to a second peer data processing system. An LCP Configure-Request packet includes, in one embodiment, a code identifying the packet's type (i.e., Configure-Request), an identifier field to uniquely associate the packet with a particular configuration request, a length field indicating the length of the packet, and a variable-length options field indicating desired changes to link default attributes such as maximum-receive-unit size, authentication-protocol, quality protocol, etc. In an alternative embodiment of the present invention, the initial LCP Configure-Request packet may originate in the second peer data processing system rather than the first.

Thereafter, a send configure acknowledgment action is performed to transfer an LCP Configure-Ack packet from the second peer data processing system to the active processor to acknowledge the reception of a Configure-Request packet with an acceptable set of configuration options. The LCP Configure-Ack packet includes, in one embodiment, a code identifying the packet's type (i.e., Configure-Ack), an identifier field including a copy of the identifier of the Configure-Request packet being acknowledged, a length field indicating the length of the packet, and an options field including an exact copy of the options field of the Configure-Request packet being acknowledged.

In one embodiment of the present invention, if every instance of the received configuration options is recognizable, but some values are not acceptable, an LCP Configure-Nak packet including an options field filled with only the unacceptable configuration options from the original configure-request packet is transferred from the second peer data processing system to the active processor. Similarly, in another embodiment a Configure-Reject packet is transferred from the second peer data processing system to the active processor if some configuration options received in the Configure-Request packet are not recognizable or are not acceptable for negotiation (e.g., as configured by a network administrator).

Additional LCP configure packets are then transferred between the first and second peer data processing systems as depicted. More specifically, an LCP Configure-Request packet is transferred from the second peer data processing system to the active processor of the first peer data processing system followed by a responsive LCP Configure-Ack packet transferred from the active processor to the second peer data processing system to configure the second peer data processing system's receive-direction portion of the point to point link in the illustrated embodiment. After both LCP Configure-Ack packets have been transmitted and received, the LCP exchange is complete and an LCP Opened state is entered.

Once the LCP Opened state has been entered, an LCP_UP state data message is transferred to the standby processor as shown and processed to recreate the point to point link's state and mirror the active processor's operational state. According to one embodiment of the present invention, state data messages such as the depicted LCP_UP state data message may include a copy of a point to point link's relevant state data (e.g., LCP Configure-Ack packets, authenticated name, etc.) organized in an attribute/value pair format further described herein with respect to FIG. 7. If a state data message such as an LCP_UP for a point to point link is not transferred or is incompletely transferred resulting in an incomplete recreation of the link's state on a standby processor, the standby processor may recognize this condition and reconfigure and/or renegotiate any or all point to point links as necessary according to one embodiment of the present invention.

It should be appreciated that additional packets (e.g., authentication, link quality, etc.) may be transferred between the first peer data processing system and the second peer data processing system during point to point link configuration in alternative embodiments of the present invention. In one such embodiment, an LCP_UP state data message is sent after the authentication of the point to point link is completed rather than immediately after a configuration acknowledgment packet (i.e., an LCP Configure-Ack packet) has been received as shown.

After the LCP portion of the link configuration has been completed and a LCP_UP state data message has been provided to the standby processor, an analogous set of NCP configure packets are transferred between the first peer data processing system's active processor and the second peer data processing system as illustrated to configure one or more NCPs such as the Internet Protocol Control Protocol (IPCP), Internetwork Packet Exchange Protocol (IPXP), IPv6 Control Protocol (IPv6CP), AppleTalk Control Protocol (ATCP), Bridging Control Protocol (BCP), Banyan Vines Control Protocol (BVCP), NetBIOS Frames Control Protocol (NBFCP), etc. on the link. More specifically, NCP Configure-Request packets are transferred from the active processor and the second peer data processing system followed by responsive NCP Configure-Ack packets.

After both NCP Configure-Ack packets have been transmitted and received, an NCP Opened state is entered and the point to point link will carry corresponding network-layer protocol packets. Once an NCP Opened state has been entered, an NCP_UP state data message is transferred to the standby processor to be processed as described herein with respect to LCP_UP state data messages. In alternative embodiments of the present invention other state data messages may be transferred from the active processor to the standby processor in response to the detection of a change in link state. For example, in one embodiment LCP_DOWN and NCP_DOWN state data messages are transferred from the active processor to the standby processor after LCP Down and NCP down states are reached, respectively.

Figure 6:
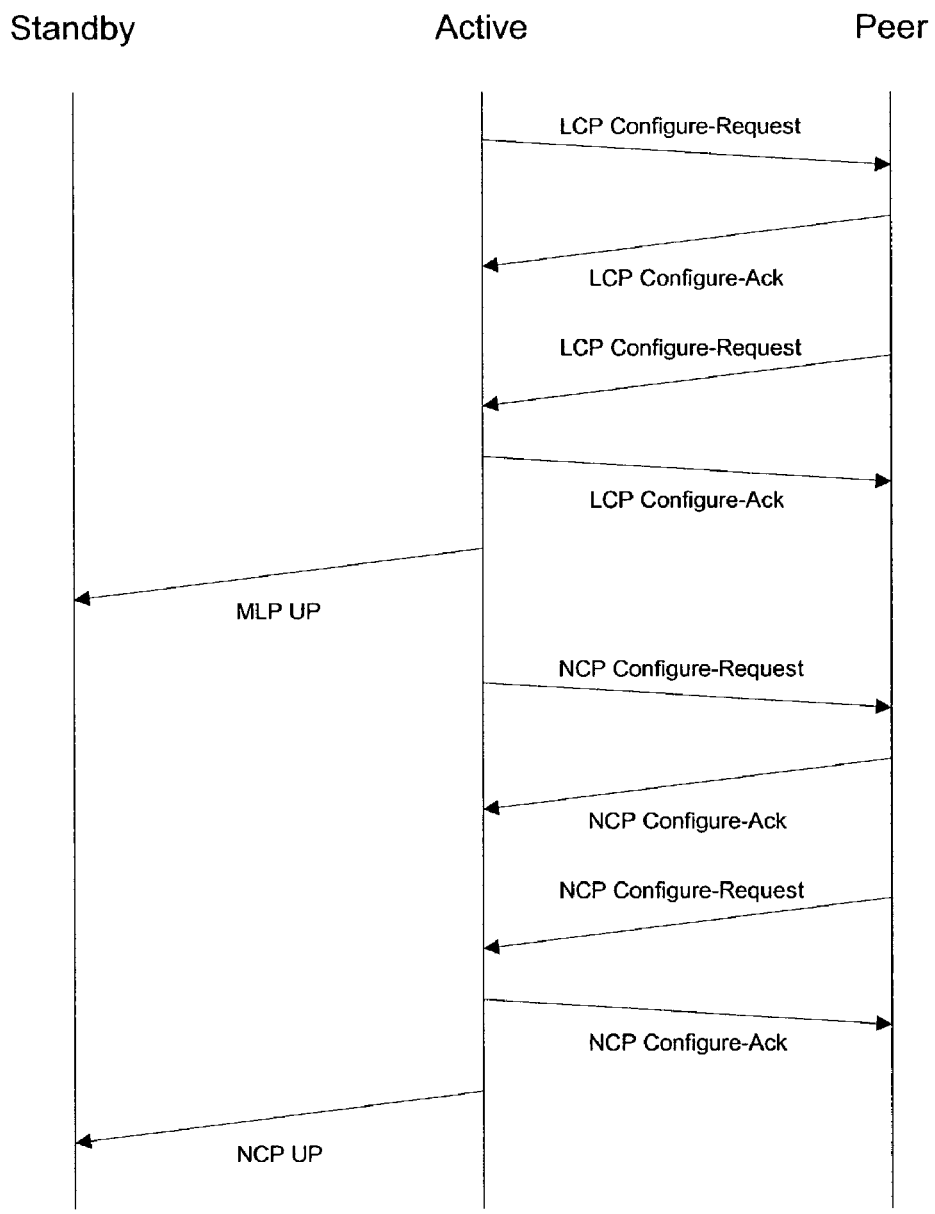
FIG. 6 illustrates a process diagram according to an embodiment of the present invention.

FIG. 6 illustrates a process diagram according to an embodiment of the present invention. According to the multilink protocol, LCP option negotiation is utilized to permit a peer data processing system to indicate that it is capable of combining multiple physical links into a single logical link or "bundle". Moreover, utilizing the multilink protocol, including transmit and receive sequence numbers and synchronization rules, packets may be split into fragments and transferred utilizing multiple parallel links between peer data processing systems in such a way that packet order is maintained. A system indicates to its peer that it is capable of supporting multilink protocol point to point links by sending a multilink option as part of the initial LCP option negotiation.

In the illustrated embodiment, a multilink protocol point to point link is configured through an exchange of LCP and NCP configure packets between a first peer data processing system including an active processor and a standby processor and a second peer data processing system as described herein with respect to FIG. 5. When a Configure-Ack packet has been both sent and received in the illustrated embodiment, an LCP Opened state is entered and a multilink bundle is created on the active processor within the first peer data processing system. Once the LCP Opened state has been entered, an MLP_UP state data message, identifying the link as MLP-formatted, is transferred to the standby processor rather than an LCP_UP state data message as previously described with respect to FIG. 5.

The standby processor receives relevant link state data in the form of attribute/value pairs within the state data message and which it processes to recreate the link's state locally. The receipt of a MLP_UP state data message causes a corresponding multilink bundle to be created on the standby processor according to one embodiment. In another embodiment of the present invention, transmit and receive sequence numbers maintained and utilized (e.g., by the active processor) to control multilink packet or "fragment" transmission are not provided to the standby processor when a switch-over condition occurs according to one embodiment. Instead, transmit and receive sequence numbers are set to zero and a peer data processing system synchronizes the receive sequence number and a formerly standby (now active) processor synchronizes to the peer's receive sequence number, thereby allowing the transfer of data over the link to continue.

Figure 7:
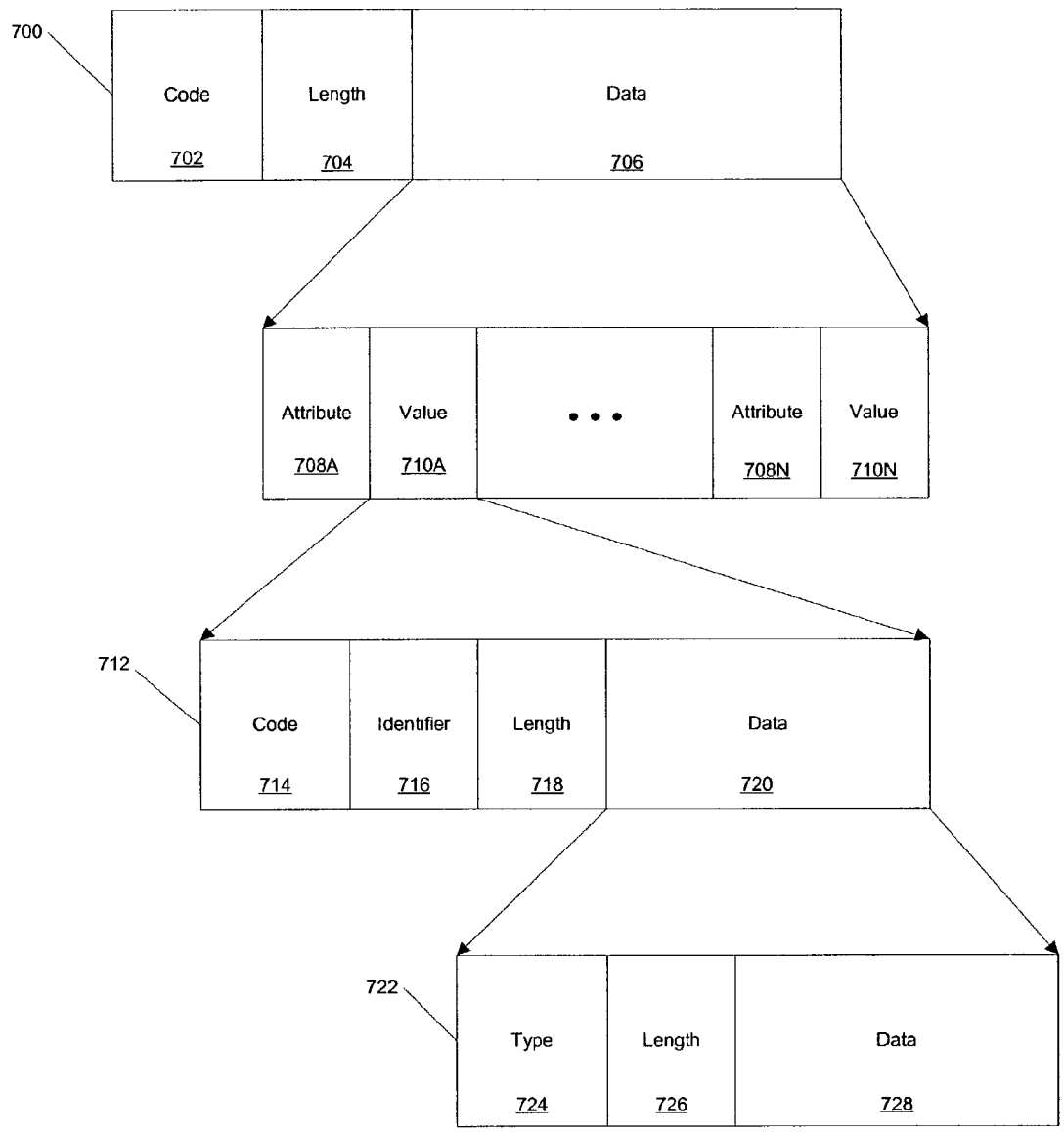
FIG. 7 illustrates a state data message diagram according to an embodiment of the present invention.

FIG. 7 illustrates a state data message diagram according to an embodiment of the present invention. The embodiment of FIG. 7 depicts a state data message 700 including a code field 702 to identify the kind or type of state data message (e.g., LCP_UP, NCP_UP, LCP_DOWN, NCP_DOWN, MLP_UP, MLP_DOWN, etc.) exchanged between the active processor and the standby processors, a length field 704 to indicate the length of the state data message, and a data field 706 including one or more pairs of state data attributes 708A-N identifying the kind or type of state data and values 710A-N including state data of the identified type. In one embodiment, state data attributes may be utilized to identify whether an associated state data value is an authenticated name, a network-protocol address, or a Configure-Ack packet, as well as the Configure-Ack packet type (e.g., LCP or NCP) and whether it was transferred from the standby processor's associated peer or another peer data processing system. In the illustrated embodiment for example, attribute 708A may include an identifier corresponding to a Configure-Ack packet state data type and value 710A may accordingly include a Configure-Ack packet 712 as shown.

Configure-Ack packet 712 of the illustrated embodiment in turn includes a code field 714 to identify the kind or type of packet (i.e., Configure-Ack), an identifier field 716, utilized in matching requests and replies which includes a copy of the identifier field of the Configure-Request packet which caused this Configure-Ack packet to be generated, a length field 718, to indicate the length of the Configure-Ack packet, and a data field 720 including a configuration option 722 that the Configure-Ack sender is acknowledging. The configuration option 722 of the described embodiment in turn includes a type field 724 to indicate the type of configuration option (e.g., Maximum-Receive-Unit, Authentication-Protocol, Quality-Protocol, Magic-Number, Protocol-Field-Compression, or Address-and-Control-Field-Compression), a length field 726 to indicate the length of the configuration option 722, and a data field 728 including information specific to the configuration option 722.

In the foregoing description, the present invention has been described with reference to specific exemplary embodiments thereof. It should be understood however that various modifications and changes may be made thereto without departing from the broader spirit and scope of the present invention as set forth in the appended claims. The specification and drawings are accordingly to be regarded in an illustrative rather than restrictive sense.

What is claimed is:

1. A method comprising:
   detecting a change in state of a point to point link between a first peer data processing system and a second peer data processing system, wherein said detecting comprises detecting an authentication of said point to point link;
   in response to said detecting, storing state data for said point to point link with an active processor within said first peer data processing system, wherein
      said storing comprises storing an authenticated peer data processing system name;
   in response to said storing, transferring a copy of said state data to a standby processor within said first peer data processing system;

detecting a switch-over condition, wherein
said detecting a switch-over condition comprises detecting a hardware failure of said active processor;
transferring data between said first peer data processing system and said second peer data processing system utilizing said active processor; and
transferring said data between said first peer data processing system and said second peer data processing system utilizing said standby processor in response to said detecting said switch-over condition.

2. The method of claim 1, wherein,
said detecting comprises,
detecting a network control protocol open event.

3. The method of claim 1, wherein,
said detecting comprises,
detecting a link control protocol close event.

4. The method of claim 1, wherein,
said detecting comprises,
detecting a network control protocol close event.

5. The method of claim 1, wherein,
said storing comprises,
storing a configuration acknowledgment packet transferred between said first peer data processing system and said second peer data processing system.

6. The method of claim 1, wherein,
said storing comprises,
storing a negotiated network-layer protocol address.

7. The method of claim 1, wherein,
said transferring comprises,
transferring a state data message including at least one attribute/value pair from said active processor to said standby processor.

8. The method of claim 1, wherein,
said detecting a switch-over condition comprises,
detecting a software failure of said active processor.

9. The method of claim 1, wherein,
said detecting a switch-over condition comprises,
detecting an administrator-initiated switch-over command.

10. A method comprising:
maintaining state data for a point to point link between a first peer data processing system and a second peer data processing system with both an active processor and a standby processor within said first peer data processing system, wherein
said maintaining comprises
storing said state data with said active processor in response to detecting said change in state, and
performing transferring said copy of said state data to said standby processor in response to storing said state data with said active processor, and
said storing comprises storing an authenticated peer data processing system name;
transferring data between said first peer data processing system and said second peer data processing system utilizing said active processor;
detecting a switch-over condition, wherein
said detecting comprises detecting a hardware failure of said active processor;
detecting a change in state of said point to point link, wherein said detecting a change in state of said point to point link comprises detecting an authentication of said point to point link; and
in response to said detecting said switch-over condition, transferring data between said first peer data processing system and said second peer data processing system utilizing said standby processor, wherein said maintaining state data comprises copying said state data in response to detecting said switch-over condition.

11. The method of claim 10, wherein,
said detecting a change in state of said point to point link comprises,
detecting a network control protocol open event.

12. The method of claim 10, wherein,
said detecting a change in state of said point to point link comprises,
detecting a link control protocol close event.

13. The method of claim 10, wherein,
said detecting a change in state of said point to point link comprises,
detecting a network control protocol close event.

14. The method of claim 10, wherein,
said storing comprises,
storing a configuration acknowledgment packet transferred between said first peer data processing system and said second peer data processing system.

15. The method of claim 10, wherein,
said storing comprises,
storing a negotiated network-layer protocol address.

16. The method of claim 10, wherein,
said transferring a copy of said state data to said standby processor comprises,
transferring a state data message including at least one attribute/value pair from said active processor to said standby processor.

17. The method of claim 10, wherein,
said maintaining comprises,
storing said state data for said point to point link with both said active processor and said standby processor; and
dynamically updating said state data with both said active processor and said standby processor.

18. The method of claim 17, wherein,
said storing comprises,
storing a configuration acknowledgment packet transferred between said first peer data processing system and said second peer data processing system.

19. The method of claim 17, wherein,
said storing comprises,
storing an authenticated peer data processing system name.

20. The method of claim 17, wherein,
said storing comprises,
storing a negotiated network-layer protocol address.

21. The method of claim 10, wherein,
said detecting comprises,
detecting a software failure of said active processor.

22. The method of claim 10, wherein,
said detecting comprises,
detecting an administrator-initiated switch-over command.

23. A method comprising:
configuring a point to point link between a first peer data processing system and a second peer data processing system, said first peer data processing system including an active processor and a standby processor;
detecting a change in state of said point to point link, wherein
said detecting a change in state of said point to point link comprises
detecting an authentication of said point to point link, and
detecting a switch-over condition, and
said switch-over condition comprises detecting a hardware failure of said active processor;

storing state data for said point to point link with both said active processor and said standby processor, wherein said storing state data comprises
transferring a copy of said state data to said standby processor in response to storing said state data at said active processor, and
storing an authenticated peer data processing system name;
dynamically updating said state data with both said active processor and said standby processor; and
transferring data between said first peer data processing system and said second peer data processing system utilizing said standby processor in response to detecting a switch-over condition.

24. The method of claim 23, wherein,
said configuring comprises,
transferring a configuration request packet and a configuration acknowledgment packet between said first peer data processing system and said second peer data processing system.

25. The method of claim 24, wherein,
said storing comprises,
storing a configuration acknowledgment packet transferred between said first peer data processing system and said second peer data processing system.

26. The method of claim 24, wherein,
said storing comprises,
storing a negotiated network-layer protocol address.

27. A computer-readable storage medium having a plurality of instructions executable by a computer embodied therein, wherein said plurality of instructions when executed cause said computer to perform a method comprising:
detecting a change in state of a point to point link between a first peer data processing system and a second peer data processing system, wherein said detecting a change in state of said point to point link comprises, detecting an authentication of said point to point link;
in response to said detecting, storing state data for said point to point link with an active processor within said first peer data processing system, wherein
said storing comprises storing state data for said point to point link selected from a group consisting of: a configuration acknowledgment packet transferred between said first peer data Processing system and said second peer data processing system, an authenticated peer data processing system name, and a negotiated network-layer protocol address;
in response to said storing, transferring a copy of said state data to a standby processor within said first peer data processing system;
transferring data between said first peer data processing system and said second peer data processing system utilizing said active processor;
detecting said switch-over condition, wherein
said detecting a switch-over condition comprises detecting a switch-over condition selected from a group consisting of: a hardware failure of said active processor, a software failure of said active processor, and an administrator-initiated switch-over command; and
transferring said data between said first peer data Processing system and said second peer data processing system utilizing said standby processor in response to said detecting said switch-over condition.

28. The computer-readable storage medium of claim 27, wherein,
said detecting comprises,
detecting a change in state of said point to point link selected from a group consisting of: a network control protocol open event, a link control protocol close event, and a network control protocol close event.

29. The computer-readable storage medium of claim 27, wherein,
said transferring comprises,
transferring a state data message including at least one attribute/value pair from said active processor to said standby processor.

30. A computer-readable storage medium having a plurality of instructions executable by a computer embodied therein, wherein said plurality of instructions when executed cause said computer to perform a method comprising:
maintaining state data for a point to point link between a first peer data processing system and a second peer data processing system with both an active processor and a standby processor within said first peer data processing system, wherein
said maintaining comprises
storing said state data with said active processor in response to detecting said change in states, and
performing transferring said copy of said state data to said standby processor in response to storing said state data with said active processor, and
said storing comprises storing an authenticated peer data processing system name;
transferring data between said first peer data processing system and said second peer data processing system utilizing said active processor;
detecting a switch-over condition, wherein
said detecting a switch-over condition is selected from a group consisting of: a hardware failure of said active processor, a software failure of said active processor, and an administrator-initiated switch-over command;
detecting a change in state of said point to point link, wherein said detecting a change in state of said point to point link comprises detecting an authentication of said point to point link; and
in response to said detecting said switch-over condition, transferring data between said first peer data processing system and said second peer data processing system utilizing said standby processor, wherein said maintaining state data comprises copying said state data in response to detecting said switch-over condition.

31. The computer-readable storage medium of claim 30, wherein,
said detecting a change in state of said point to point link comprises,
detecting a change in state of said point to point link selected from a group consisting of: a network control protocol open event, a link control protocol close event, and a network control protocol close event.

32. The computer-readable storage medium of claim 30, wherein,
said transferring a copy of said state data to said standby processor comprises,
transferring a state data message including at least one attribute/value pair from said active processor to said standby processor.

33. The computer-readable storage medium of claim 30, wherein,
  said maintaining comprises,
    storing said state data for said point to point link with both said active processor and said standby processor; and
    dynamically updating said state data with both said active processor and said standby processor.

34. The computer-readable storage medium of claim 33, wherein,
  said storing comprises,
    storing state data for said point to point link selected from a group consisting of: a configuration acknowledgment packet transferred between said first peer data processing system and said second peer data processing system, an authenticated peer data processing system name, and a negotiated network-layer protocol address.

35. A computer-readable storage medium having a plurality of instructions executable by a computer embodied therein, wherein said plurality of instructions when executed cause said computer to perform a method comprising:
  configuring a point to point link between a first peer data processing system and a second peer data processing system, said first peer data processing system including an active processor and a standby processor;
  detecting a change in state of said point to point link, wherein
    said detecting a change in state of said point to point link comprises
      detecting an authentication of said point to point link, and
      detecting a switch-over condition, and
    said switch-over condition comprises detecting a hardware failure of said active processor;
  storing state data for said point to point link with both said active processor and said standby processor, wherein
    said storing state data comprises
      transferring a copy of said state data to said standby processor in response to storing said state data at said active processor, and
      storing state data for said point to point link selected from a group consisting of: a configuration acknowledgment packet transferred between said first peer data processing system and said second peer data processing system, an authenticated peer data processing system name, and a negotiated network-layer protocol address;
  dynamically updating said state data with both said active processor and said standby processor; and
  transferring data between said first peer data processing system and said second peer data processing system utilizing said standby processor in response to detecting a switch-over condition.

36. The computer-readable storage medium of claim 35, wherein,
  said configuring comprises,
    transferring a configuration request packet and a configuration acknowledgment packet between said first peer data processing system and said second peer data processing system.

37. An apparatus comprising:
  means for detecting a change in state of a point to point link between a first peer data processing system and a second peer data processing system, wherein said detecting a change in state of said point to point link comprises, detecting an authentication of said point to point link;
  means for storing state data for said point to point link with an active processor within said first peer data processing system in response to a detection of a change in state of said point to point link, wherein
    said means for storing comprises means for storing state data for said point to point link selected from a group consisting of: a configuration acknowledgment packet transferred between said first peer data processing system and said second peer data processing system, an authenticated peer data processing system name, and a negotiated network-layer protocol address;
  means for transferring, in response to said state data being stored with said active processor, a copy of said state data to a standby processor within said first peer data processing system;
  means for detecting a switch-over condition, wherein
    said means for detecting a switch-over condition comprises means for detecting a hardware failure of said active processor; and
  means for transferring data between said first peer data processing system and said second peer data processing system utilizing said standby processor in response to said means for detecting said switch-over condition and coupled thereto.

38. The apparatus of claim 37, further comprising,
  means for transferring data between said first peer data processing system and said second peer data processing system utilizing said active processor;
  means for transferring said data between said first peer data processing system and said second peer data processing system utilizing said standby processor in response to said detection of a switch-over condition.

39. The apparatus of claim 38, wherein,
  said means for detecting a switch-over condition comprises,
    means for detecting a switch-over condition selected from a group consisting of: a hardware failure of said active processor, a software failure of said active processor, and an administrator-initiated switch-over command.

40. The apparatus of claim 37, wherein,
  said means for detecting comprises,
    means for detecting a change in state of said point to point link selected from a group consisting of: a network control protocol open event, a link control protocol close event, and a network control protocol close event.

41. The apparatus of claim 37, wherein,
  said means for transferring comprises,
    means for transferring a state data message including at least one attribute/value pair from said active processor to said standby processor.

42. An apparatus comprising:
  means for maintaining state data for a point to point link between a first peer data processing system and a second peer data processing system with both an active processor and a standby processor within said first peer data processing system, wherein
    said means for maintaining comprises
      means for storing said state data with said active processor in response to a detection of a chance in state of said point to point link, and
      means for performing transferring said copy of said state data to said standby processor in response to said state data being stored with said active processor, and
    said means for storing comprises means for storing state data for said point to point link selected from a croup consisting of: a configuration acknowledgment packet transferred between said first peer data processing system and said second peer data processing system, an authenticated peer data processing system name, and a negotiated network-layer protocol address;

means for transferring data between said first peer data processing system and said second peer data processing system utilizing said active processor;

means for detecting a switch-over condition, wherein
said means for detecting comprises means for detecting a switch-over condition selected from a group consisting of: a hardware failure of said active processor, a software failure of said active processor, and an administrator-initiated switch-over command;

means for detecting a change in state of said point to point link, wherein said detecting a change in state of said point to point link comprises, detecting an authentication of said point to point link; and means for transferring data, in response to a detection of a switch-over condition, between said first peer data processing system and said second peer data processing system utilizing said standby processor, wherein said means for maintaining state data comprises means for copying said state data in response to detecting said switch-over condition.

43. The apparatus of claim 42, wherein,
said means for detecting a change in state of said point to point link comprises,
means for detecting a change in state of said point to point link selected from a group consisting of: a network control protocol open event, a link control protocol close event, and a network control protocol close event.

44. The apparatus of claim 42, wherein,
said means for transferring a copy of said state data to said standby processor comprises,
means for transferring a state data message including at least one attribute/value pair from said active processor to said standby processor.

45. The apparatus of claim 42, wherein,
said means for maintaining comprises,
means for storing said state data for said point to point link with both said active processor and said standby processor; and
means for dynamically updating said state data with both said active processor and said standby processor.

46. The apparatus of claim 45, wherein,
said means for storing comprises,
means for storing state data for said point to point link selected from a group consisting of: a configuration acknowledgment packet transferred between said first peer data processing system and said second peer data processing system, an authenticated peer data processing system name, and a negotiated network-layer protocol address.

47. An apparatus comprising:
means for configuring a point to point link between a first peer data processing system and a second peer data processing system, said first peer data processing system including an active processor and a standby processor;

means for detecting a change in state of said point to point link, wherein
said means for detecting a change in state of said point to point link comprises
detecting an authentication of said point to point link, and
detecting a switch-over condition, and
said switch-over condition comprises detecting a hardware failure of said active processor;

means for storing state data for said point to point link with both said active processor and said standby processor, wherein
said means for storing state data comprises
means for transferring a copy of said state data to said standby processor in response to storing said state data at said active processor, and
means for storing state data for said point to point link selected from a group consisting of: a configuration acknowledgment packet transferred between said first peer data processing system and said second peer data processing system, an authenticated peer data processing system name, and a negotiated network-layer protocol address;

means for dynamically updating said state data with both said active processor and said standby processor; and means for transferring data between said first peer data processing system and said second peer data processing system utilizing said standby processor responsive to a detection of a switch-over condition.

48. The apparatus of claim 47, wherein,
said means for configuring comprises,
means for transferring a configuration request packet and a configuration acknowledgment packet between said first peer data processing system and said second peer data processing system.

49. A data processing system comprising:
a line card to provide a point to point link between said data processing system and a peer data processing system, the line card detecting a change in state of said point to point link, wherein said detecting a change in state of said point to point link comprises detecting an authentication of said point to point link;

an active processor coupled to said line card to configure said point to point link, to store state data for said point to point link locally, to transfer data utilizing said point to point link, and to transmit a copy of said state data to a standby processor, wherein
said detecting comprises detecting a hardware failure of said active processor, and
said active processor is configured to maintain state data for said point to point link; and a standby processor coupled to said active processor to receive said state data, to store said state data locally, to detect a switch-over condition in said active processor, and to transfer data utilizing said point to point link in response to a detection of a switch-over condition in said active processor by copying said state data in response to said detection of said switch-over condition, wherein
both said active processor and said standby processor are within said data processing system,
said detecting comprises detecting a hardware failure of said active processor,
said maintaining comprises
storing said state data with said active processor in response to detecting said change in state, and
performing transferring said copy of said state data to said standby processor in response to storing said state data with said active processor, and
said storing comprises storing an authenticated peer data processing system name.

* * * * *